(12) United States Patent
Davis et al.

(10) Patent No.: US 10,938,847 B2
(45) Date of Patent: Mar. 2, 2021

(54) AUTOMATED DETERMINATION OF RELATIVE ASSET IMPORTANCE IN AN ENTERPRISE SYSTEM

(71) Applicant: EMC IP Holding Company LLC, Hopkinton, MA (US)

(72) Inventors: Sashka T. Davis, Vienna, VA (US); Kevin T. Douglas, Vienna, VA (US); Zulfikar A. Ramzan, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 164 days.

(21) Appl. No.: 16/229,075

(22) Filed: Dec. 21, 2018

(65) Prior Publication Data

US 2020/0204576 A1 Jun. 25, 2020

(51) Int. Cl.
*H04L 29/06* (2006.01)
(52) U.S. Cl.
CPC .......... *H04L 63/1425* (2013.01); *H04L 63/20* (2013.01)
(58) Field of Classification Search
None
See application file for complete search history.

(56) References Cited

U.S. PATENT DOCUMENTS

| 8,495,745 | B1 | 7/2013 | Schrecker et al. |
| 9,571,512 | B2* | 2/2017 | Ray ..................... H04L 63/1425 |
| 2008/0307525 | A1 | 12/2008 | Nickle |
| 2010/0153156 | A1 | 6/2010 | Guinta et al. |
| 2015/0310215 | A1 | 10/2015 | McBride et al. |
| 2016/0248794 | A1 | 8/2016 | Cam |
| 2018/0027006 | A1* | 1/2018 | Zimmermann ..... H04L 63/0245 726/11 |

OTHER PUBLICATIONS

J. Leskovec et al., "Mining of Massive Datasets," Cambridge University Press, 2011, 513 pages.
Santosh S. Vempala, "The Random Projection Method," Center for Discrete Mathematics and Theoretical Computer Science (DIMACS), Oct. 13, 2006, 48 pages.

(Continued)

*Primary Examiner* — Brandon S Hoffman
(74) *Attorney, Agent, or Firm* — Ryan, Mason & Lewis, LLP (57) ABSTRACT

A method includes obtaining usage metrics for assets of an enterprise system and extracting sets of features from the obtained usage metrics, the sets of features characterizing relative importance of each of the assets for each of two or more designated time windows. The method also includes determining, utilizing the extracted features, an importance of each of the assets. The method further includes establishing a baseline behavior of the assets based on the extracted features, monitoring behavior of the assets during at least one additional time window, and modifying a configuration of a given asset responsive to detecting that the monitored behavior of the given asset during the at least one additional time window exhibits a threshold difference from the established baseline behavior of the given asset, wherein the modification is based at least in part on the importance of the given asset relative to one or more other assets.

20 Claims, 5 Drawing Sheets

(56) References Cited

OTHER PUBLICATIONS

V.D. Blondel et al., "Fast Unfolding of Communities in Large Networks," Journal of Statistical Mechanics: Theory and Experiment, Oct. 9, 2008, 12 pages, vol. 2008, No. 10.
T.G. Kolda et al., "Tensor Decompositions and Applications," Society for Industrial and Applied Mathematics (SIAM) Review, Aug. 2009, pp. 455-500, vol. 51, No. 3.
Béla Bollobás, "Modern Graph Theory," Graduate Texts in Mathematics, 1998, 4 pages, vol. 184.
Olle Häggström, "Finite Markov Chains and Algorithmic Applications," London Mathematical Society Student Texts, 2001, 125 pages.
Wade Shen, "Active Social Engineering Defense (ASED)," DARPA Information Innovation Office (DOD-DARPA-I2O), Nov. 9, 2017, 15 pages.

* cited by examiner

AUTOMATED DETERMINATION OF RELATIVE ASSET IMPORTANCE IN AN ENTERPRISE SYSTEM

FIELD

The field relates generally to information security, and more particularly to detection of security threats in enterprise systems.

BACKGROUND

Various entities are subject to different types of security threats. Some security threats relate to networking and computer security for an enterprise system. Security threats include, for example, vulnerabilities in assets of the enterprise system, which present risks that can expose the enterprise and its users or devices. Further, it is difficult to ascertain asset importance in enterprise systems, particularly as the number of assets in enterprise systems grows. The task of monitoring assets of an enterprise system for security threats or other issues thus presents various challenges.

SUMMARY

Illustrative embodiments of the present invention provide techniques for determining the relative importance of assets in an enterprise system. Embodiments advantageously utilize the determined importance of the assets in the enterprise system to provide increased visibility into the state of the enterprise system, and to provide more efficient monitoring of asset behavior.

In one embodiment, a method comprises obtaining usage metrics for a plurality of assets of an enterprise system, and extracting, for each of the plurality of assets, a set of features from the obtained usage metrics, the extracted sets of features characterizing relative importance of each of the plurality of assets for each of two or more designated time windows. The method also comprises determining, utilizing the extracted sets of features, an importance of each of the plurality of assets relative to one or more other ones of the plurality of assets of the enterprise system. The method further comprises establishing a baseline behavior of the plurality of assets based on the extracted sets of features for the two or more designated time windows, monitoring behavior of the plurality of assets during at least one additional time window, and modifying a configuration of a given one of the plurality of assets responsive to detecting that the monitored behavior of the given asset during the at least one additional time window exhibits a threshold difference from the established baseline behavior of the given asset, wherein the modification is based at least in part on the determined importance of the given asset relative to one or more other ones of the plurality of assets of the enterprise system. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

An organization or other enterprise is typically limited in its ability to distinguish between the true value and importance of an asset in the enterprise system versus its perceived value. As assets are provisioned and deployed in an enterprise system, an administrator or other authorized individual may associate a perceived value with the new assets. Over time, the usage of such assets (e.g., numbers of requests and responses, volume of traffic and amount of activity over a period of time, etc.) can be used to perform a quantitative analysis to determine asset behavior and the actual importance of assets, as well as to map enterprise-level application and asset activity.

In some embodiments, quantitative techniques are provided for determining asset importance (e.g., ranking of asset importance relative to other assets in an enterprise system). Techniques are also provided for collecting time series data to determine a baseline for asset behavior. The baseline asset behavior may then be utilized to determine deviations therefrom. Such deviations may be useful for determining when an asset's importance or ranking should change, to determine threats or risk to an enterprise system, etc. Techniques are further provided for building asset-centric and application-centric models of an enterprise system.

Illustrative embodiments advantageously provide the ability for automatically and dynamically identifying asset importance and sets of similar assets in a manner that is independent of a user-supplied asset criticality map. The knowledge about enterprise assets and applications may be used in some embodiments to prioritize security-related events, to implement security hardening and monitoring procedures, to provide increased visibility of the state of an enterprise system from asset and application standpoints, etc.

While some security products claim to increase security visibility (e.g., via network traffic, network flow traffic using NetFlow or other tools, logs, etc.), such products do not provide the ability to combine information from these and other sources to provide a profile for estimating asset importance or asset behavior. Further, such products do not provide for generating enterprise-wide models for identifying important applications, assets, clusters of assets, etc.

Figure 1:
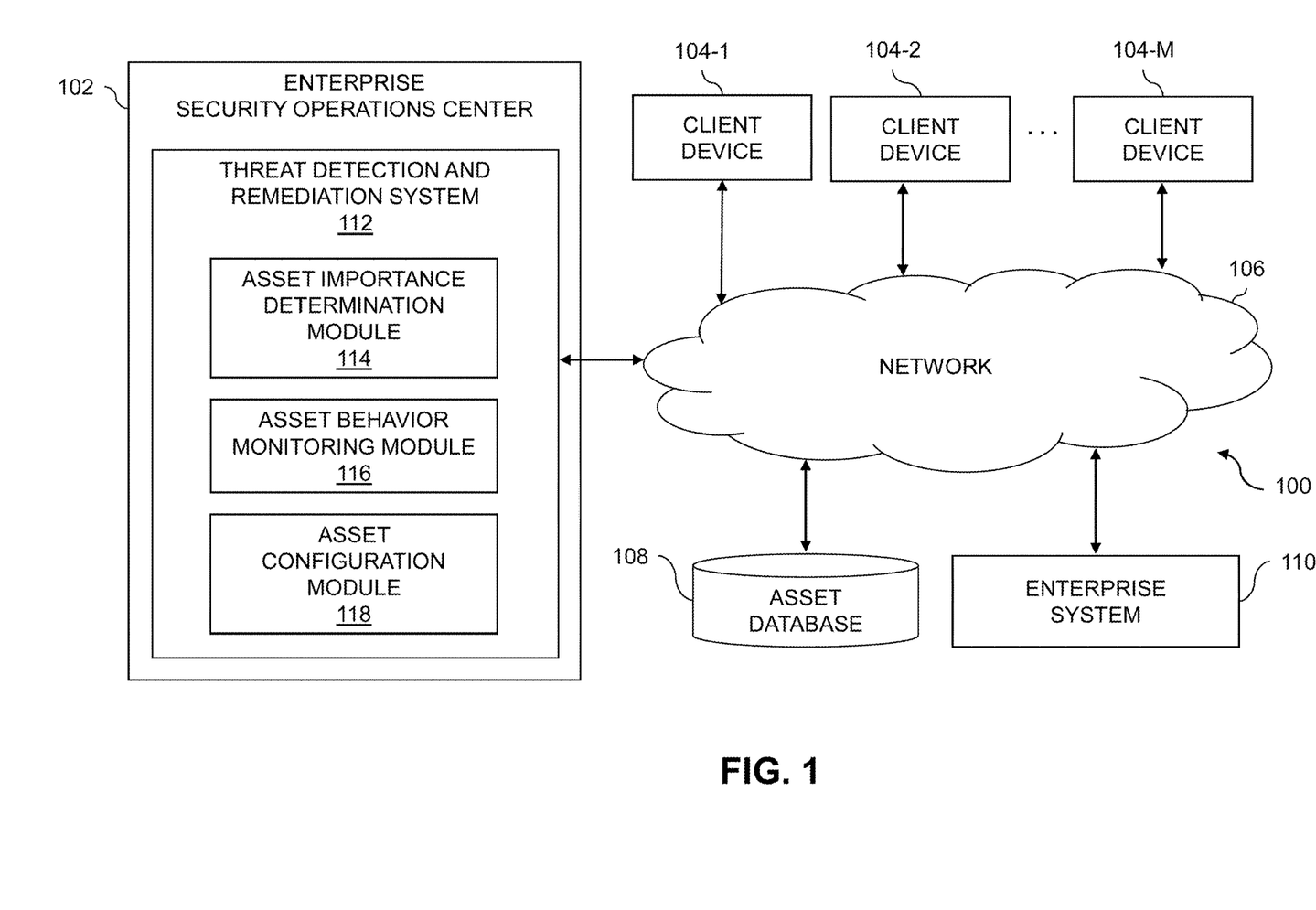
FIG. 1 is a block diagram of an information processing system for determining asset importance in an illustrative embodiment of the invention.

FIG. 1 shows an information processing system 100 configured in accordance with an illustrative embodiment. The information processing system 100 is assumed to be built on at least one processing platform and provides functionality for determining relative asset importance in an enterprise system 110. The assets may include, by way of example, physical and virtual computing resources in the enterprise system 110. Physical computing resources may include physical hardware such as servers, storage systems, networking equipment, Internet of Things (IoT) devices, other types of processing and computing devices, etc. Virtual computing resources may include virtual machines (VMs), containers, etc.

In this embodiment, the system 100 more particularly comprises an enterprise security operations center (SOC) 102 and a plurality of client devices 104-1, 104-2, . . . 104-M, collectively referred to herein as client devices 104. The client devices 104 are coupled to a network 106. Also coupled to the network 106 is an asset database 108, which may store various information relating to asset importance and asset behavior as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The asset database 108, as discussed above, is configured to store and record information relating to assets of the enterprise system 110. Such information may include extracted features that characterize asset importance, time series data for modeling asset behavior, etc.

The asset database 108 in some embodiments is implemented using one or more storage systems or devices associated with the enterprise SOC 102. In some embodiments, one or more of the storage systems utilized to implement the asset database 108 comprises a scale-out all-flash content addressable storage array such as an XtremIO™ storage array from Dell EMC of Hopkinton, Massachusetts. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

The client devices 104 are configured to access or otherwise utilize an enterprise system 110. The enterprise system 110 may represent an information technology (IT) infrastructure comprising a plurality of assets (e.g., physical or virtual computing resources) of a business, entity or other enterprise.

In the present embodiment, alerts or notifications generated by a threat detection and remediation system 112 of the enterprise SOC 102 are provided over network 106 to client devices 104, or to a system administrator, IT manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given security or host agent may comprise a mobile telephone equipped with a mobile application configured to receive alerts from the enterprise SOC 102 or the threat detection and remediation system 112 and to provide an interface for the security agent to select particular remedial measures for responding to the alert or notification. Examples of such remedial measures may include blocking access by one or more of the client devices 104 to assets of the enterprise system 110, requiring user input or authentication by the client devices 104 to obtain information from or otherwise utilize one or more assets of the enterprise system 110, triggering further review of the enterprise system 110 or assets thereof (e.g., in response to detecting changes in asset behavior), etc. Remedial measures may also include applying security hardening procedures to assets of the enterprise system 110, establishing new or modified monitoring of assets of the enterprise system 110, changing or adjusting the configuration of assets of the enterprise system 110, etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 112. As will be described in further detail below, the threat detection and remediation system 112 is configured to determine the importance of assets in the enterprise system 110, and to monitor asset behavior of assets of the enterprise system 110.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises an asset importance determination module 114, an asset behavior monitoring module 116, and an asset configuration module 118.

The asset importance determination module 114 is configured to obtain usage metrics for a plurality of assets of the enterprise system 110. The asset importance determination module 114 is further configured to extract, for each of the plurality of assets, a set of features from the obtained usage metrics. The extracted sets of features characterize the relative importance of each of the plurality of assets for each of two or more designated time windows. The asset importance determination module 114 is further configured to determine an importance of each of the plurality of assets, relative to one or more other ones of the plurality of assets of the enterprise system 110, utilizing the extracted sets of features.

The asset behavior monitoring module 116 is configured to establish a baseline behavior of the plurality of assets based on the extracted sets of features for the two or more designated time windows. The asset behavior monitoring module 116 is also configured to monitor behavior of the plurality of assets during at least one additional time window.

The asset configuration module 118 is configured to modify a configuration of a given one of the plurality of assets responsive to detecting that the monitored behavior of the given asset during the at least one additional time window exhibits a threshold difference from the established baseline behavior of the given asset. The modification is based at least in part on the determined importance of the given asset relative to one or more other ones of the plurality of assets of the enterprise system 110. For example, various tasks for modifying the configuration of assets in the enterprise system 110 may be prioritized based on the importance of the assets. Further, the type of modification performed may change based on the importance of the given asset. When modifying the configuration involves applying security hardening procedures, for example, the type and extent of the security hardening may be based on asset importance.

It is to be appreciated that the particular arrangement of the enterprise SOC 102, threat detection and remediation system 112, asset importance determination module 114, asset behavior monitoring module 116 and asset configuration module 118 illustrated in the FIG. 1 embodiment is presented by way of example only, and alternative arrangements can be used in other embodiments. As discussed above, for example, the enterprise SOC 102, threat detection and remediation system 112, asset importance determination module 114, asset behavior monitoring module 116 and asset configuration module 118 may in some embodiments be implemented internal to one or more of the client devices 104. As another example, the functionality associated with the asset importance determination module 114, asset behavior monitoring module 116 and asset configuration module 118 may be combined into one module, or separated across more than three modules with the multiple modules possibly being implemented with multiple distinct processors or processing devices.

At least portions of the asset importance determination module 114, asset behavior monitoring module 116 and asset configuration module 118 may be implemented at least in part in the form of software that is stored in memory and executed by a processor.

It is to be understood that the particular set of elements shown in FIG. 1 for determining asset importance is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (SIEM) system such as the RSA NetWitness® Platform Evolved SIEM, commercially available from RSA Security LLC ("RSA"), part of Dell EMC of Hopkinton, Mass., a Governance, Risk and Compliance (GRC) system, etc.

The threat detection and remediation system 112 and other portions of the system 100, as will be described in further detail below, may be part of cloud infrastructure such as an Amazon Web Services (AWS) system. Other examples of cloud-based systems that can be used to provide the threat detection and remediation system 112 include Virtustream Enterprise Cloud, Virtustream Storage Cloud, Google Cloud Platform (GCP) and Microsoft Azure.

The threat detection and remediation system 112 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The client devices 104 and threat detection and remediation system 112 or components thereof (e.g., asset importance determination module 114, asset behavior monitoring module 116 and asset configuration module 118) may be implemented on respective distinct processing platforms, although numerous other arrangements are possible. For example, in some embodiments at least portions of the threat detection and remediation system 112 and one or more of the client devices 104 are implemented on the same processing platform. A given client device (e.g., 104-1) can therefore be implemented at least in part within at least one processing platform that implements at least a portion of the threat detection and remediation system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, threat detection and remediation system 112 or portions or components thereof, to reside in different data centers. Numerous other distributed implementations are possible. The threat detection and remediation system 112 can also be implemented in a distributed manner across multiple data centers.

Additional examples of processing platforms utilized to implement threat detection and remediation system 112 in illustrative embodiments will be described in more detail below in conjunction with FIGS. 4 and 5.

It is to be appreciated that these and other features of illustrative embodiments are presented by way of example only, and should not be construed as limiting in any way.

An exemplary process for determining asset importance in an enterprise system will now be described in more detail with reference to the flow diagram of FIG. 2. It is to be understood that this particular process is only an example, and that additional or alternative processes for determining asset importance can be carried out in other embodiments.

In this embodiment, the process includes steps 200 through 210. These steps are assumed to be performed by the threat detection and remediation system 112 utilizing the asset importance determination module 114, asset behavior monitoring module 116 and asset configuration module 118. The process begins with step 200, obtaining usage metrics for a plurality of assets of an enterprise system. The enterprise system may comprise IT infrastructure of an enterprise, including but not limited to physical infrastructure such as a data center, combinations of physical and virtual infrastructure such as a software-defined data center, a cloud computing infrastructure, etc. The plurality of assets may comprise physical or virtual computing resources, such as servers, storage systems, virtual machines, containers, etc.

In step 202, sets of features are extracted from the obtained usage metrics for each of the plurality of assets. The extracted sets of features characterize relative importance of each of the plurality of assets for each of two or more designated time windows. In some embodiments, step 200 includes monitoring the plurality of assets of the enterprise system to obtain network traffic information and log information, and extracting features in step 202 includes identifying usage metrics associated with one or more applications running on the plurality of assets utilizing at least one of: a protocol type of at least a portion of the network traffic information; a port associated with at least a portion of the network traffic information; and one or more identifiers in message logs of the log information.

The extracted set of features, for a given asset, may comprise a number of connections for the given asset, a number of bytes transferred to and from the given asset, and a percentage of time that the given asset is in use during a given one of the designated time windows. The extracted set of features may further comprise one or more of a number of incoming connections to the given asset, a number of outgoing connections from the given asset, a number of incoming bytes transferred to the given asset, a number of outgoing bytes transferred from the given asset, a number of incoming requests to the given asset, and a number of outgoing responses from the given asset.

In step 204, an importance of each of the plurality of assets is determined utilizing the extracted sets of features. The importance of each asset is determined relative to one or more other ones of the plurality of assets of the enterprise system. Determining the importance of each of the plurality of assets may comprise, for a given asset: computing at least one rank of a value of at least a given one of the extracted features for each of one or more applications running on the given asset relative to values of extracted features for that application running on one or more other ones of the plurality of assets; and determining at least one importance measure as a weighted sum of the computed ranks for each of the one or more applications running on the given asset weighted by a fraction of time the given asset serves each of the one or more applications running on the given asset. The given extracted feature may be one that is deemed important for a particular use cases scenario, such as a number of connections for the given asset or a number of bytes transferred to and from the given asset.

Figure 2:
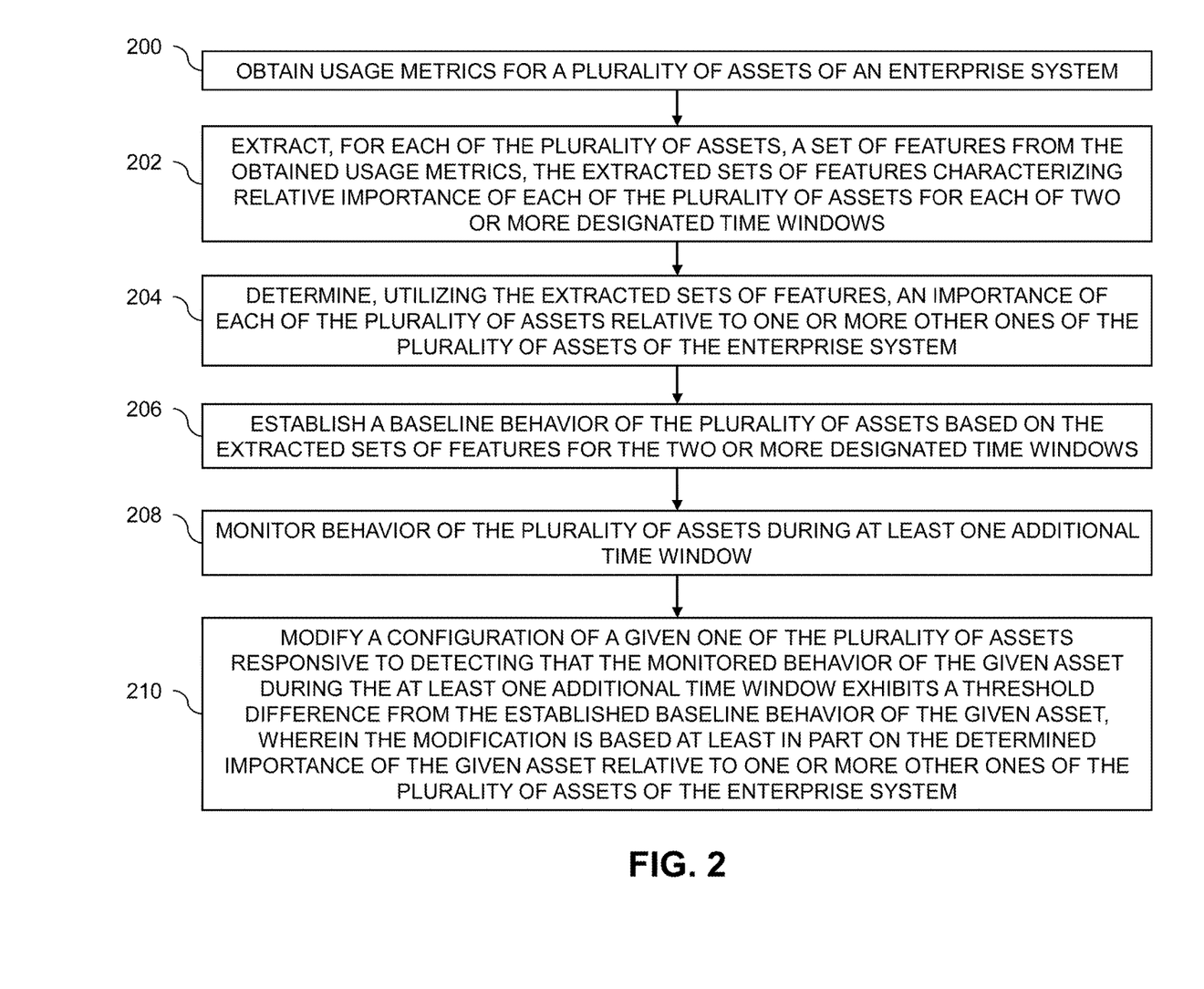
FIG. 2 is a flow diagram of an exemplary process for determining asset importance in an illustrative embodiment.

The FIG. 2 process continues with step 206, establishing a baseline behavior of the plurality of assets based on the extracted sets of features for the two or more designated time windows. The behavior of the plurality of assets is then monitored during at least one additional time window in step 208.

Establishing the baseline behavior in step 206 may comprise computing at least one of a mean, a median and a variance of one or more of the extracted set of features for the two or more designated time windows. In some embodiments, monitoring the behavior of the plurality of assets during the at least on additional time window in step 208 may comprise, for a given asset, at least one of: utilizing a first test (e.g., a p-value test) to determine if a mean of at least one of the extracted set of features for the given asset in the at least one additional time window exhibits a statistically significant difference from the mean of the at least one extracted feature in the baseline behavior of the given asset; utilizing a second test (e.g., a Kruskal-Wallis test) to determine if a median of the at least one extracted feature in the at least one additional time window exhibits a statistically significant difference from the median of the at least one extracted feature in the baseline behavior of the given asset; and utilizing a third test (e.g., an F-test) to determine if a variance of the at least one extracted feature in the at least one additional time window exhibits a statistically significant difference from the variance of the at least one extracted feature in the baseline behavior of the given asset.

In other embodiments, monitoring the behavior of the plurality of assets during the at least one additional time window in step 208 comprises, for the given asset, generating a first one-dimensional probability distribution of the baseline behavior of the given asset, generating a second one-dimensional probability distribution of behavior of the given asset during the at least one additional time window, and utilizing at least one test (e.g., a Kolmogorov-Smirnoff test, a Kullback-Leibler divergence test, etc.) to estimate a variational distance between the first and second one-dimensional probability distributions.

In some embodiments, monitoring the behavior of the plurality of assets during the at least one additional time window in step 208 comprises building a model of application traffic for a plurality of applications running on the plurality of assets of the enterprise system utilizing extracted sets of features from the plurality of assets of the enterprise system for the two or more designated time windows, defining a set of change indicators, and utilizing the set of change indicators to detect whether the monitored behavior of any of the plurality of assets of the enterprise system during the at least one additional time window exhibits a threshold difference from the established baseline behavior of the plurality of assets of the enterprise system. The set of change indicators may comprise at least one of a most heavily utilized one of the plurality of applications, a least heavily utilized one of the plurality of applications, a most important one of the plurality of assets for a given one of the plurality of applications, a distribution of traffic among the plurality of applications, and a distribution of a number of users of the given application.

In still other embodiments, combinations of the above approaches may be used to monitor the behavior of the plurality of assets during the at least one additional time window in step 208.

In step 210 a configuration of a given one of the plurality of assets is modified responsive to detecting that the monitored behavior of the given asset during the at least one additional time window exhibits a threshold difference from the established baseline behavior of the given asset. The modification is based at least in part on the determined importance of the given asset relative to one or more other ones of the plurality of assets of the enterprise system. For example, modifications to the configuration of the given asset may be prioritized among multiple proposed or scheduled modifications to respective ones of the plurality of assets in accordance with the determined importance of such assets. As another example, the type of modification that is performed may be based on the importance of the asset. This may involve taking different action to modify the configuration, such as selecting between more aggressive and less aggressive modifications, applying or expending more or less time, expense, or other resources to the modification, etc. For example, modifying the configuration in step 210 may include applying one or more security hardening procedures to the configuration of the given asset, identifying and correcting a misconfiguration of one or more aspects of the given asset, blocking one or more connections to the given asset, generating an alert or other notification to a security or host agent as described above, etc.

In some embodiments, step 210 may further include identifying a cluster of two or more assets, including the given asset, by analyzing behavior profiles of each of the plurality of assets and each of a plurality of applications running on the plurality of assets. The modification in step 210 may involve modifying configurations of each of the two or more assets in the identified cluster. Analyzing the behavior profiles may comprise building an asset-application bipartite graph comprising a first portion with nodes representing respective ones of the plurality of applications, a second portion with nodes representing respective ones of the plurality of assets, and edges connecting application nodes in the first portion with the asset nodes in the second portion, building an asset-application adjacency matrix to learn asset embedding, and utilizing one or more similarity measures to identify the cluster of two or more assets.

Figure 3:
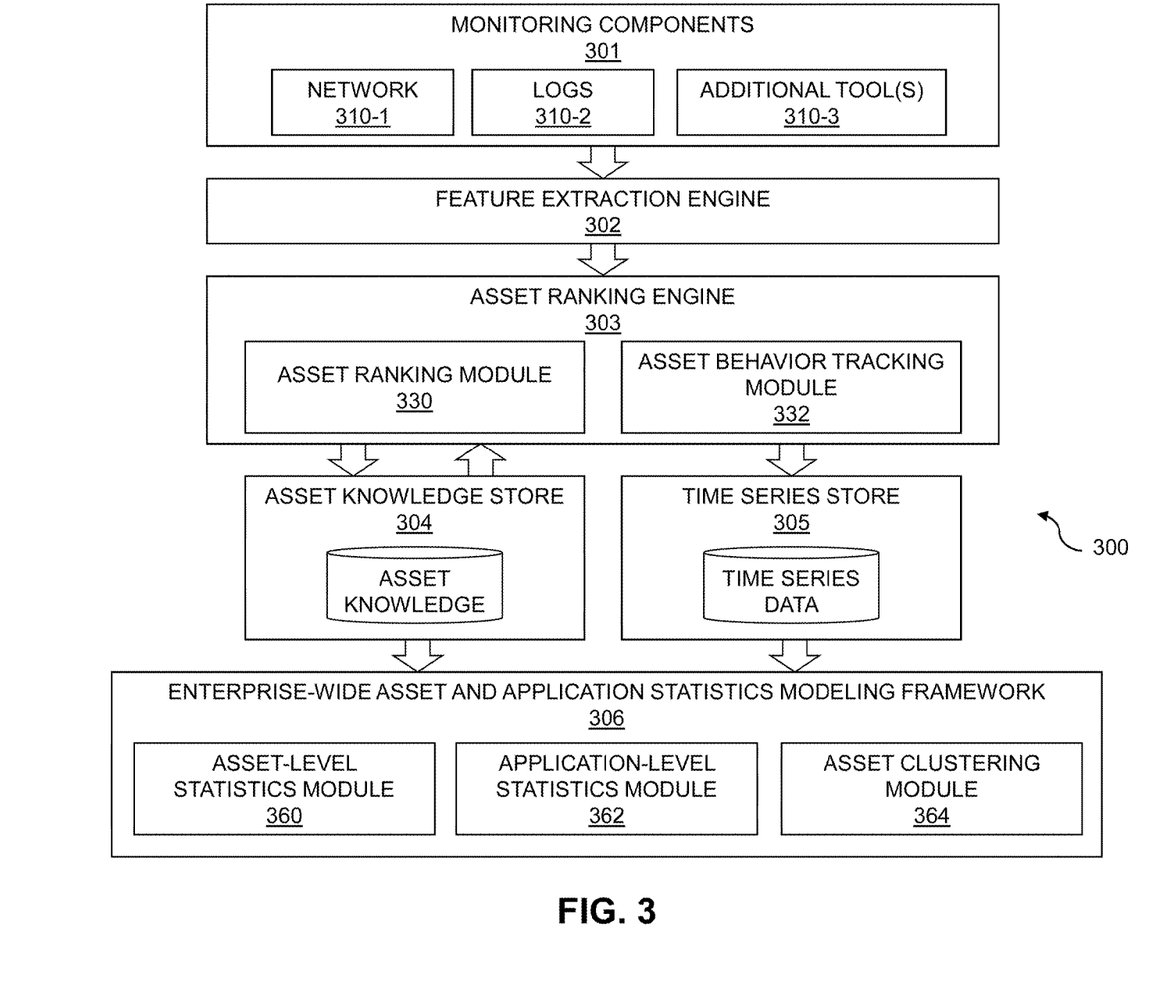
FIG. 3 is a block diagram of an information processing system for generating enterprise-wide asset and application statistics in an illustrative embodiment.

FIG. 3 shows a system 300 for generating enterprise-wide asset and application statistics. Information which is collected via monitoring components 301 is processed using a feature extraction engine 302 in order to transform raw data points into a rich feature set for each asset. These features are ingested by an asset ranking engine 303 in order to determine an asset's level of importance based on volume of activity and usage patterns over a time series. This information is stored in an asset knowledge store 304 and a time series store 305. The usage patterns and activity volumes stored in the asset knowledge store 304 and time series store 305 are utilized by an enterprise-wide asset and application statistics modeling framework 306 to determine enterprise-level rankings for assets. The operation of the system 300 will be described in further detail below.

Monitoring components 301 are configured to gather asset usage metrics and observe asset usage behavior from a variety of vantage points. The monitoring components 301 may utilize network monitoring 310-1, log monitoring 310-2 and additional monitoring 310-3. Network monitoring 310-1 provides monitoring of network sessions (e.g., packets or other network traffic) in order to capture the usage metrics associated with an asset. Log monitoring 310-2 monitors system and application log files in order to capture usage metrics and behavior patterns associated with an asset. Additional monitoring 310-3 may utilize tools such as NetFlow to collect additional usage and behavior pattern data associated with assets.

It should be appreciated that the monitoring components 301 may capture information on an asset-level basis, as well as on an application-level basis (e.g., an asset may run multiple different applications). The network monitoring 310-1 may distinguish between different applications by monitoring the protocol and port used for particular packets or other network traffic. The log monitoring 310-2, as noted above, may utilize application logs to provide such application-level monitoring (e.g., using application names or other identifiers in such logs, etc.). The additional monitoring tools 310-3 may similarly provide functionality for separating or distinguishing different application traffic associated with an asset.

The feature extraction engine 302 is responsive for ingesting information from the various monitoring components 301, and for extracting and transforming raw data points into more meaningful features used by the asset ranking engine 303. In some embodiments, such features include but are not limited to: number of connections; number of bytes transferred; percentage of time in use; number of incoming connections; number of outgoing connections; number of incoming bytes; number of outgoing bytes; number of incoming requests; and number of outgoing requests.

The asset ranking engine 303 includes an asset ranking module 330 and an asset behavior tracking module 332. The asset ranking engine 303 leverages the indicators or features extracted by the feature extraction engine 302 in order to estimate asset importance utilizing the asset ranking module 330, and to track asset behavior and usage patterns over time utilizing the asset behavior tracking module 332 (e.g., to build snapshots of how particular assets are used for particular periods of time). Such information is ultimately used to determine asset rankings using quantitative analysis. In some embodiments, an asset's level of importance is based at least in part on what applications run on that asset, and on how that asset is used (e.g., the asset's usage patterns).

The asset knowledge store 304 represents learned knowledge of the features associated with each asset in an enterprise system. The time series store 305 represents the learned knowledge of asset usage and behavior patterns over one or more designated time series. The asset knowledge information in asset knowledge store 304 and the time series data (e.g., the time-based view of asset usage) is provided to the enterprise-wide asset and application statistics modeling framework 306.

The enterprise-wide asset and application statistics modeling framework 306 is configured to determine a quantitative ranking of each asset in an enterprise system, based on how the usage metrics and activity or behavior patterns of each asset vary over time as compared with other assets in the enterprise system. The enterprise-wide asset and application statistics modeling framework 306 includes an asset-level statistics module 360, an application-level statistics module 362 and an asset clustering module 364. The asset-level statistics module 360 provides asset-level rankings or other information, the application-level statistics module 362 provides application-level rankings or other information, and the asset clustering module 364 provides cluster-level rankings or other information.

In a data processing and gathering phase, the monitoring components 301 provide and gather raw data points from various sources (e.g., network monitoring 310-1, logs monitoring 310-2, additional monitoring tools 310-3 such as NetFlow, etc.). The feature extraction engine 302 extracts and transforms the raw data into a set of usage and behavior features. The usage and behavior features enable the performance of quantitative analysis of asset importance, behavior tracking, and clustering in an enterprise system as described herein.

Monitoring components 301 provide a pluggable architecture that allows additional sources (e.g., additional instances of or additional types of tools for monitoring applications and assets of an enterprise system) to be added for the purpose of extracting usage metrics. The pluggable monitoring sources, in some embodiments, are assumed to be able to provide raw data metrics which indicate, or allow to be determined, the volume of use for any given asset (e.g., an Internet Protocol (IP) address or other identifier) or application thereof in an enterprise system. The network monitoring tools 310-2, for example, provide a source of information regarding network sessions (e.g., number of incoming bytes, number of outgoing bytes, total number of bytes, time of day, etc.). While these metrics are useful features as is, they may also be used to derive additional follow-on features (e.g., number of connections, percentage of time in use over a time period, number of incoming connections, number of outgoing connections, etc.). Thus, the raw data metrics for a single network session can be combined with previous network session data to determine a feature set that describes total usage metrics over some defined period of time.

The feature extraction engine 302, in the data processing and gathering phase, gathers the raw data from the monitoring components 301 into a rich feature set for each asset (e.g., using Extract, Transform and Load (ETL) or other suitable techniques). Depending on the capabilities of the monitoring components 301, the feature extraction engine 302 may extract one or more features directly or may transform raw data metrics into more useful features. The set of features is then used by the asset ranking engine 303 to ultimately determine an estimation of asset importance utilizing asset ranking module 330 and asset behavior modeling using asset behavior tracking module 332 as described in further detail below.

In some embodiments, asset estimation techniques first build a local profile of each asset and the applications that it runs (e.g., including information such as the number of users served by the asset and its applications, the fraction of time that the asset dedicates to a particular application, etc.). The asset ranking module 330 then compares and ranks the measurements of the local profile for each asset relative to a global profile of all applications or assets in the enterprise system.

The local profile for each asset may be built using a feature set extracted by the feature extraction engine 302 using raw data information or metrics from the monitoring components 301 (e.g., network traffic, logs information, NetFlow information, etc.). The quantitative information about the services and applications that run on or utilize each asset is gathered from the information which that asset exports. An observation window or measurement period is fixed, and the asset ranking engine 303 gathers information about all applications that the asset serves during the observation period.

During a measurement window W, for each individual application the following feature set may be collected:
Feature 1—total number of connections;
Feature 2—total number of bytes transferred;
Feature 3—fraction of time that the service was used during the measurement window;
Feature 4—number of incoming connections;
Feature 5—number of outgoing connections;
Feature 6—number of bytes transferred along incoming connections; and
Feature 7—number of bytes transferred along outgoing connections.

It should be appreciated that this particular set of features 1-7 is presented by way of example, and that embodiments are not limited solely to use with these features, and also do not require use of all of these features. In other embodiments, one or more other features may be collected in addition to or in place of one or more of features 1-7.

The measurement window W can be any desired time period, including but not limited to 1 hour, 4 hours, 8 hours, 1 day, the length of a "typical" work week (e.g., an accumulation of statistics during the 24 hours Monday through Friday, or some other work week depending on the locale), etc. It should be noted that there is a trade-off between granularity and noise in the selection of the length of the measurement window W. The shorter the measurement window W, the noisier the measurements will be. In some embodiments, it is assumed that an interval of 8 hours (e.g., during a work day depending on the locale) is selected for monitoring application servers in an enterprise system. In other embodiments, different intervals may be chosen as desired.

An application running on an asset may be identified using a protocol, port number or both (e.g., from network traffic), from a name in a message log, etc. For example, if an asset is running an instance of an Oracle® database with a standard installation, this application may be identified as transmission control protocol (TCP), port 1521. As another example, a standard installation of a simple mail transfer protocol (SMTP) server may be identified with TCP protocol, port 25.

For each asset i, and for each application j, the seven features 1-7 described above are collected in some embodiments. These seven features are denoted $F_{i,j,k}$ as for k={1, 2, 3, 4, 5, 6, 7}. As an example, suppose that asset 1 runs three applications denoted 1, 2 and 4, and that asset 2 runs three applications denoted 1, 3 and 5. The seven features for each application of assets 1 and 2 will be denoted as:
Asset 1 Application 1: $[F_{1,1,1}, \ldots, F_{1,1,7}]$ Asset 1 Application 2: $[F_{1,2,1}, \ldots, F_{1,2,7}]$
Asset 1 Application 4: $[F_{1,4,1}, \ldots, F_{1,4,7}]$
Asset 2 Application 1: $[F_{2,1,1}, \ldots, F_{2,1,7}]$
Asset 2 Application 3: $[F_{2,3,1}, \ldots, F_{2,3,7}]$
Asset 2 Application 5: $[F_{2,5,1}, \ldots, F_{2,5,7}]$ In an asset ranking and importance estimation phase, the asset ranking engine 303 determines the asset ranking using asset ranking module 330. Suppose that there are N assets and M applications in the enterprise system. An application denoted J is selected, and the values of the seven features $k=1, \ldots, 7$ for asset p are compared relative to all other assets for the same features and the same application. In other words, the asset ranking engine 303 ranks each feature for each asset relative to the same feature of all other assets. In some embodiments, at least one of a percentile rank and a quartile rank are used to compute the rank $(F_{p,J,k})$ using all values $F_{i,J,k}$ for all assets $i=1, \ldots, n$ in the enterprise system. The percentile rank of $F_{p, J, k}$ is computed as:

$$P_{rank}(P_{p,J,k}) = 100 * (\text{fraction of } F_{i,J,k}, \text{ for } i=1, \ldots, n \text{ that are below } F_{p,J,k})$$

The quartile rank of $F_{p, J, k}$ is computed as:

$$Q_{rank}(F_{p,J,k}) = \{1, 2, 3, \text{ or } 4\}, \text{ if } F_{p,J,k} \text{ is in the } 1^{st}, 2^{nd}, 3^{rd}, \text{ or } 4^{th} \text{ quartile, respectively.}$$

Suppose that the ranking is based on the number of connections (e.g., Feature 1) or total bytes transferred (e.g., Feature 2) for a specific application. Then, for each asset in the enterprise system, the percentile and quartile indicate the relative position of an asset with respect to all other assets in the enterprise system that are observed to serve traffic related to the application of interest.

Quartile rank is more robust but less granular than percentile rank, while percentile rank provides a higher ranking precision but at the cost of noise. If the measurement interval is relatively large (e.g., a few days, a week, etc.), then the percentile rank may be a more useful or appropriate statistic than the quartile rank. If the measurement interval is relatively small (e.g., a few hours), then the quartile rank might be more useful or appropriate statistic than the percentile rank.

In some embodiments, two importance measures are associated with each asset. The first importance measure takes into account the number of connections, denoted as CI, and the second importance measure takes into the total number of bytes transferred, denoted as BTI. The connection importance and byte transfer importance may be selected in some embodiments as it is assumed that these features are easily gathered and thus generally available for all assets and applications. In other embodiments, however, different features may be used to compute importance measures.

For an asset i, let J(i) be the set of applications observed during the observation window. The connection importance of i, CI(i), is computed as:

$$CI(i) = \sum_{j \in J(i)} \text{rank}(F_{i,j,1}) \times F_{i,j,3}.$$

In a similar fashion, the byte transfer importance of i, BTI, is computed as:

$$BTI(i) = \sum_{j \in J(i)} \text{rank}(F_{i,j,2}) \times F_{i,j,3}.$$

In either case, the rank may be either the percentile rank $P_{rank}$ or the quartile rank $Q_{rank}(R_{i,j,*})$, where * indicates feature 1 or 2 for the connection importance measure or the bytes transferred importance measure. Note that CI(i) and BTI(i) of asset i are the weighted sums of the ranks of the number of connections and the total bytes transferred for each application, respectively, weighted by the fraction of time the asset serves a given application (e.g., weighted by $F_{i,j,3}$).

Additional features, such as features 4, 5, 6 and 7, may be used in some embodiments to provide tie breaks. One or more of features 4, 5, 6 and 7, or one or more other features, may be used in place of features 1 and 2, particularly in cases where an analyst has knowledge of the applications deployed on the enterprise system and believes that differentiation between such other features are more indicative of asset importance than features 1 and 2. Absent such knowledge, some embodiments assume that the features 1 and 2 (e.g., the number of connections and bytes transferred, respectively) are the appropriate features to use for ranking and importance estimation.

In an asset behavior modeling and monitoring phase, the asset ranking engine 303 determines the asset behavior using asset behavior tracking module 332. For each asset i in the enterprise system, and for each application $j \in J(i)$, all measurements are collected for $F_{i,j,k}$ for $k=1, 2, 4, 5, 6, 7$ during n consecutive observation intervals to produce a time series. The time series is used to produce a baseline behavior profile of the asset for a given application. During the next or the future n consecutive observation intervals of the same asset and application, the descriptive statistics are compared and tested for statistical significance to detect deviation from the baseline behavior profile.

In some embodiments, referred to as approach 1, the mean, median and variance of the baseline time series and a selected time series (e.g., the current time series, or a selected one of the historical time series) are computed. A p-value test for statistical significance is then used to measure if the mean of the selected time series is different from that of the baseline. The Kruskal-Wallis test may be used to check if there is a significant different between the two medians (e.g., between the selected time series and the baseline). The F-test may be used to check if there is a significant difference between the two variances (e.g., between the selected time series and the baseline).

In other embodiments, referred to as approach 2, the baseline and a selected time series (e.g., the current time series, or a selected one of the historical time series) may be treated as one-dimensional probability distributions. Kolmogorov-Smirnoff or Kullback-Leibler divergence testing may then be used to compare the two samples (e.g., the baseline and the selected time series) to estimate variational distances between them. It should be noted that approach 1 is generally more robust than approach 2. In some cases, however, approach 2 may be preferred. Further, some embodiments may use both approach 1 and approach 2.

The enterprise-wide asset and application statistics modeling framework 306 builds two models for entities at the enterprise level—a first model for assets using the asset-level statistics module 360 and a second model for applications using the application-level statistics module 362. These models are useful to model the state of the enterprise system, and to track changes in the state of the enterprise system.

Suppose that there are N assets and M applications in the enterprise system. For each asset $i \in [N]$, let $T_i$ be the set of applications for which traffic is observed during the observation window. Let $T=\cup_{i\in[N]}T_i$ be the set of all possible applications in the enterprise that have collected data for features k=1, 2, 4, 5, 6, 7 and assets $i\in[N]$. The features are aggregated to build a model of the application traffic of the enterprise system as follows. The following indicators are defined, and their behavior are observed over time:

1. The most and least heavily used application in the enterprise system. The most heavily used application $$= \operatorname*{argmax}_{j\in T} \sum_{i\in[N]} F_{i,j,1}.$$

The least heavily used application $$= \operatorname*{argmin}_{j\in T} \sum_{i\in[N]} F_{i,j,1}.$$

2. For each service $j\in T$, the most and least important assets. The most important asset, $$\text{traffic-centric} = \operatorname*{argmax}_{i\in[N]} F_{i,j,1}.$$

The most important asset, $$\text{user-centric} = \operatorname*{argmax}_{i\in[N]} F_{i,j,2}.$$

3. Changes of the distribution of traffic of an application. In addition to monitoring the most and least heavily used applications, some embodiments track the distribution of the amount of traffic for each application for a new observation window (e.g., a week, a month, etc.). The change of this distribution over time can be estimated using the distribution-free Kolmogorov-Smirnoff test or another suitable technique.

4. Changes of the distribution of the combined number of users on individual applications. This indicator may be tracked in a manner similar to that of 3, by tracking this distribution for a new observation window.

The changes of the indicators 1 and 2 (e.g., the most and least heavily used applications, and the most and least important assets) are observed or monitored over time. Also, the set of applications T that are being served by assets of the enterprise system can be monitored over time. Metrics such as set difference and Jaccard similarity may be used to check for changes in these indicators.

The knowledge of the set of applications T at the enterprise level and the set of applications associated with each individual asset can be used to detect misconfiguration, intrusion, new asset behavior, etc. Responsive to detecting such changes, various remedial actions can be taken such as security hardening procedures, configuration changes, etc.

The enterprise-wide asset and application statistics modeling framework 306 is further configured to cluster the assets of the enterprise system using asset clustering module 364. The asset clustering module 364 is configured to use all the data about the assets of the enterprise system to identify similar assets, or to cluster assets based on their profiles. Such clustering may be used to determine remedial actions to initiate. For example, responsive to detecting an intrusion on a given asset in a given cluster, security hardening procedures may be applied not only to the given asset but to all assets in the given cluster.

For each asset $i\in[N]$, let $T_i$ be the set of applications for which traffic is observed during a sequence of measurement windows (e.g., each day in a work, each week in a month, etc.). An asset-application bipartite graph is built, with one part of the bipartite graph being the set of assets [N] and the other part of the bipartite graph being the set of applications $T=\cup_{i\in[N]}T_i$. For each asset $i\in[N]$ in the enterprise system, i is connected to all nodes $T_i$ with an edge.

Next, an asset-application adjacency matrix is built. In some embodiments, Singular Value Decomposition (SVD) or Non-Negative Matrix Factorization (NMF) is used to learn a lower dimensional algebraic embedding. Principal Component Analysis (PCA) may also or alternatively be used in some embodiments to compute a lower dimensional subspace prior to clustering. In addition to SVD, NMF and PCA, some embodiments may use a Random Projection method to learn a low-dimensional low-distortion asset embedding prior to clustering.

Cosine-similarity or Euclidean distance may be used in some embodiments as a similarity measure between assets during clustering. A standard hierarchical agglomerative clustering may be used to identify similar assets in some embodiments. In other embodiments, a Louvain algorithm may be used to identify communities or clusters of assets by minimizing modularity.

A supervised lower dimensional subspace can be produced by giving an analyst the set of applications T and asking the analyst to produce a subset of applications T' of importance for analysis. This will result in building a bipartite graph with one part being the set of assets [N] and the other part being the set of important applications T'. Each asset i is connected to all nodes $T'\cap T_i$ with an edge. Hierarchical agglomerative clustering or the Louvain algorithm can then be used to identify groups or clusters of similar assets with respect to the important applications.

In some embodiments, it may be known that a small set of assets are of high importance to an enterprise system. In such cases, the local profile of each such asset built using the features 1-7 described above can be used to identify similar assets. The features 1-7 are numeric, and thus a nearest neighbor search and Euclidean distance may be used to find imposter assets or unknown-but-important assets when such assets are "projected" to the applications-space of the important assets.

In some embodiments, asset clustering techniques model the relationships between assets and applications as a two-dimensional matrix but ignore the information gathered for each asset $i\in[N]$ and each application $j\in T$. Some embodiments may utilize such information to form a three-dimensional tensor matrix and utilize tensor decompositions to identify sets of similar assets.

As noted above, the asset-level and application-level statistics and asset clustering information generated by the enterprise-wide asset and application modeling framework 306 may be used to initiate various actions in an enterprise system. One use case is in providing a technique for unsupervised ranking of the importance of each asset of the enterprise system (e.g., based on number of connections, traffic amount and other features as described above) using comparative methods for security and increased visibility of risks and possible threats to the enterprise system. As one example, such techniques may be used to discover assets in an enterprise system which are important, and thus events or incidents may be prioritized in accordance with asset importance. Further, proactive steps may be taken. If it is determined that an asset's importance is above some designated threshold (e.g., using a percentile or quartile rank), security hardening procedures may be applied to protect that asset from security threats.

Another use case is in asset behavior tracking and clustering. Asset behavior tracking may be used to determine whether a particular asset's behavior changes over time, which may indicate the presence of a security threat such as a virus, malware, adware, etc. For example, an important asset (e.g., an asset whose importance exceeds some designated threshold such as using a percentile or quartile rank) whose usage patterns vary significantly from a baseline behavior may be a cause for concern, triggering further review of the configuration and security protections of that asset. Further, asset clustering may be used to detect abnormal asset behavior which may trigger such further review or other remedial action. If an asset belonging to a cluster exhibits deviation from the behavior patterns of other assets in that cluster, remedial action may be taken. Asset clustering may further be used for peer group analysis of assets, servers, etc. in the enterprise system.

Yet another use case is utilizing asset ranking and behavior tracking to build a global view of an enterprise system that reflects the most important or most frequently used assets and applications. This global view may be used to trigger actions such as capacity upgrades, applying security hardening procedures, re-distributing load across assets in the enterprise system, etc. Quantitative data regarding applications and assets may be further used for the assessment of the network or other configuration of an enterprise system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for determining asset importance will now be described in greater detail with reference to FIGS. 4 and 5. Although described in the context of system 100, these platforms may also be used to implement at least portions of other information processing systems in other embodiments.

Figure 4:
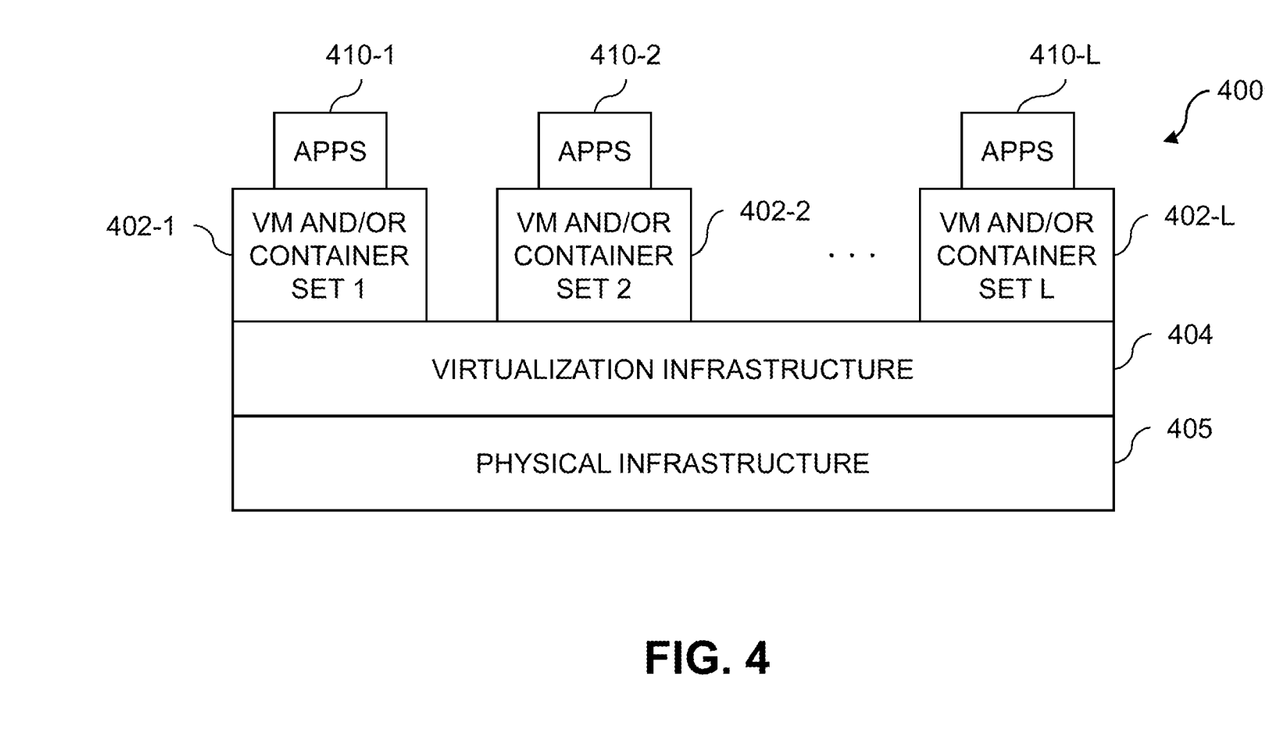
FIGS. 4 and 5 show examples of processing platforms that may be utilized to implement at least a portion of an information processing system in illustrative embodiments.
Figure 5:
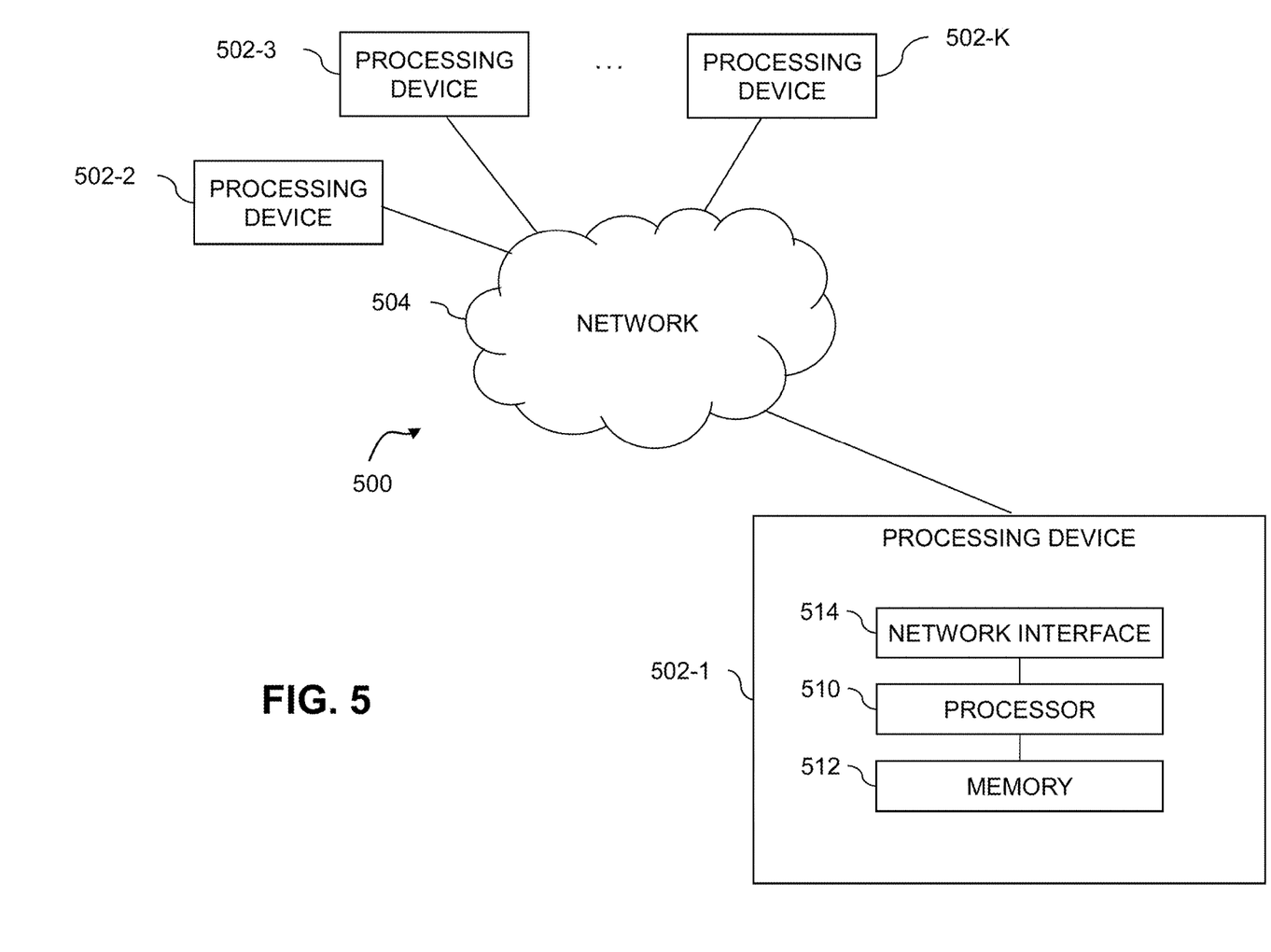

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for determining asset importance as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, enterprise systems, assets, features, monitoring tools, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
obtaining usage metrics for a plurality of assets of an enterprise system;
extracting, for each of the plurality of assets, a set of features from the obtained usage metrics, the extracted sets of features characterizing relative importance to operation of the enterprise system of each of the plurality of assets for each of two or more designated time windows;
determining, utilizing the extracted sets of features, an importance to the operation of the enterprise system of each of the plurality of assets relative to one or more other ones of the plurality of assets of the enterprise system;
establishing a baseline behavior of the plurality of assets based on the extracted sets of features for the two or more designated time windows;
monitoring behavior of the plurality of assets during at least one additional time window; and
modifying a configuration of a given one of the plurality of assets responsive to detecting that the monitored behavior of the given asset during the at least one additional time window exhibits a threshold difference from the established baseline behavior of the given asset;
wherein at least one of: an order in which the configuration of the given asset is modified relative to modification in configuration of one or more additional ones of the plurality of assets; and a type of the modification performed for the given asset is based at least in part on the determined importance to the operation of the enterprise system of the given asset relative to one or more other ones of the plurality of assets of the enterprise system;
wherein the method is performed by at least one processing device comprising a processor coupled to a memory.

2. The method of claim 1 wherein obtaining the usage metrics comprises monitoring the plurality of assets of the enterprise system to obtain network traffic information and log information, and wherein extracting the sets of features characterizing the importance to the operation of the enterprise system of each of the plurality of assets comprises identifying usage metrics associated with one or more applications running on the plurality of assets utilizing at least one of: a protocol type of at least a portion of the network traffic information; a port associated with at least a portion of the network traffic information; and one or more identifiers in message logs of the log information.

3. The method of claim 1 wherein the extracted set of features for the given asset comprises:
a number of connections for the given asset;
a number of bytes transferred to and from the given asset; and
a percentage of time that the given asset is in use during a given one of the designated time windows.

4. The method of claim 3 wherein the extracted set of features for the given asset further comprises at least one of:
a number of incoming connections to the given asset;
a number of outgoing connections from the given asset;
a number of incoming bytes transferred to the given asset;
a number of outgoing bytes transferred from the given asset;
a number of incoming requests to the given asset; and
a number of outgoing response from the given asset.

5. The method of claim 1 wherein determining the importance to the operation of the enterprise system of each of the plurality of assets comprises, for the given asset:
computing at least one rank of a value of at least a given one of the extracted features for each of one or more applications running on the given asset relative to values of extracted features for that application running on one or more other ones of the plurality of assets; and
determining at least one importance measure as a weighted sum of the computed ranks for each of the one or more applications running on the given asset weighted by a fraction of time the given asset serves each of the one or more applications running on the given asset.

6. The method of claim 5, wherein the given extracted feature comprises one of: a number of connections for the given asset; and a number of bytes transferred to and from the given asset.

7. The method of claim 1 wherein establishing the baseline behavior for the plurality of assets comprises computing at least one of a mean, a median and a variance of one or more of the extracted set of features for the two or more designated time windows.

8. The method of claim 1 wherein monitoring the behavior of the plurality of assets during the at least one additional time window comprises, for the given asset, at least one of:
utilizing a first test to determine if a mean of at least one of the extracted set of features for the given asset in the at least one additional time window exhibits a statistically significant difference from the mean of the at least one extracted feature in the baseline behavior of the given asset;
utilizing a second test to determine if a median of the at least one extracted feature in the at least one additional time window exhibits a statistically significant difference from the median of the at least one extracted feature in the baseline behavior of the given asset; and
utilizing a third test to determine if a variance of the at least one extracted feature in the at least one additional time window exhibits a statistically significant difference from the variance of the at least one extracted feature in the baseline behavior of the given asset.

9. The method of claim 1 wherein monitoring the behavior of the plurality of assets during the at least one additional time window comprises, for the given asset:
generating a first one-dimensional probability distribution of the baseline behavior of the given asset;
generating a second one-dimensional probability distribution of behavior of the given asset during the at least one additional time window; and
estimating a variational distance between the first and second one-dimensional probability distributions.

10. The method of claim 1 wherein monitoring the behavior of the plurality of assets during the at least one additional time window comprises:
building a model of application traffic for a plurality of applications running on the plurality of assets of the enterprise system utilizing extracted sets of features from the plurality of assets of the enterprise system for the two or more designated time windows;
defining a set of change indicators; and
utilizing the set of change indicators to detect whether the monitored behavior of any of the plurality of assets of the enterprise system during the at least one additional time window exhibits a threshold difference from the established baseline behavior of the plurality of assets of the enterprise system.

11. The method of claim 1 wherein the set of change indicators comprises at least one of:
a most heavily utilized one of the plurality of applications;
a least heavily utilized one of the plurality of applications;
a most important one of the plurality of assets for a given one of the plurality of applications;
a distribution of traffic among the plurality of applications; and
a distribution of a number of users of the given application.

12. The method of claim 1 further comprising identifying a cluster of two or more assets, including the given asset, by analyzing behavior profiles of each of the plurality of assets and each of a plurality of applications running on the plurality of assets.

13. The method of claim 12 wherein analyzing the behavior profiles comprises:
building an asset-application bipartite graph comprising a first portion with nodes representing respective ones of the plurality of applications, a second portion with nodes representing respective ones of the plurality of assets, and edges connecting application nodes in the first portion with the asset nodes in the second portion;
building an asset-application adjacency matrix to learn asset embedding; and
utilizing one or more similarity measures to identify the cluster of two or more assets.

14. The method of claim 12 wherein modifying the configuration of the given asset further comprises modifying configurations of each of the two or more assets in the cluster.

15. The method of claim 1 wherein the given asset comprises at least one of a physical computing resource and a virtual computing resource.

16. The method of claim 1 wherein modifying the configuration of the given asset comprises at least one of:
applying one or more security hardening procedures to the configuration of the given asset;
identifying and correcting a misconfiguration of one or more aspects of the given asset; and
blocking one or more connections to the given asset.

17. A computer program product comprising a non-transitory processor-readable storage medium having stored therein program code of one or more software programs, wherein the program code when executed by at least one processing device causes the at least one processing device:
to obtain usage metrics for a plurality of assets of an enterprise system;
to extract, for each of the plurality of assets, a set of features from the obtained usage metrics, the extracted sets of features characterizing relative importance to operation of the enterprise system of each of the plurality of assets for each of two or more designated time windows;
to determine, utilizing the extracted sets of features, an importance to the operation of the enterprise system of each of the plurality of assets relative to one or more other ones of the plurality of assets of the enterprise system;
to establish a baseline behavior of the plurality of assets based on the extracted sets of features for the two or more designated time windows;
to monitor behavior of the plurality of assets during at least one additional time window; and
to modify a configuration of a given one of the plurality of assets responsive to detecting that the monitored behavior of the given asset during the at least one additional time window exhibits a threshold difference from the established baseline behavior of the given asset;
wherein at least one of: an order in which the configuration of the given asset is modified relative to modification in configuration of one or more additional ones of the plurality of assets; and a type of the modification performed for the given asset is based at least in part on the determined importance to the operation of the enterprise system of the given asset relative to one or more other ones of the plurality of assets of the enterprise system.

18. The computer program product of claim 17 wherein the program code when executed by the at least one processing device further causes the at least one processing device to identify a cluster of two or more assets, including the given asset, by analyzing behavior profiles of each of the plurality of assets and each of a plurality of applications running on the plurality of assets, and wherein modifying the configuration of the given asset further comprises modifying configurations of each of the two or more assets in the cluster.

19. An apparatus comprising:

at least one processing device comprising a processor coupled to a memory;

the at least one processing device being configured:

to obtain usage metrics for a plurality of assets of an enterprise system;

to extract, for each of the plurality of assets, a set of features from the obtained usage metrics, the extracted sets of features characterizing relative importance to operation of the enterprise system of each of the plurality of assets for each of two or more designated time windows;

to determine, utilizing the extracted sets of features, an importance to the operation of the enterprise system of each of the plurality of assets relative to one or more other ones of the plurality of assets of the enterprise system;

to establish a baseline behavior of the plurality of assets based on the extracted sets of features for the two or more designated time windows;

to monitor behavior of the plurality of assets during at least one additional time window; and to modify a configuration of a given one of the plurality of assets responsive to detecting that the monitored behavior of the given asset during the at least one additional time window exhibits a threshold difference from the established baseline behavior of the given asset;

wherein at least one of: an order in which the configuration of the given asset is modified relative to modification in configuration of one or more additional ones of the plurality of assets;

and a type of the modification performed for the given asset is based at least in part on the determined importance to the operation of the enterprise system of the given asset relative to one or more other ones of the plurality of assets of the enterprise system.

20. The apparatus of claim 19 wherein the at least one processing device is further configured to identify a cluster of two or more assets, including the given asset, by analyzing behavior profiles of each of the plurality of assets and each of a plurality of applications running on the plurality of assets, and wherein modifying the configuration of the given asset further comprises modifying configurations of each of the two or more assets in the cluster.

* * * * *